Sept. 23, 1969 T. J. O'CONNOR 3,469,056
VIBRATORY ELECTRIC ARC DRILL

Filed Jan. 11, 1965 2 Sheets-Sheet 1

INVENTOR.
THOMAS J. O'CONNOR
BY *Whittemore,*
*Hulbert & Belknap*
ATTORNEYS

Sept. 23, 1969    T. J. O'CONNOR    3,469,056
VIBRATORY ELECTRIC ARC DRILL
Filed Jan. 11, 1965    2 Sheets-Sheet 2

INVENTOR.
THOMAS J. O'CONNOR
BY
ATTORNEYS

United States Patent Office 3,469,056
Patented Sept. 23, 1969

3,469,056
VIBRATORY ELECTRIC ARC DRILL
Thomas J. O'Connor, 100 Morgan Road,
Ann Arbor, Mich. 48104
Filed Jan. 11, 1965, Ser. No. 424,622
Int. Cl. B23k 9/16
U.S. Cl. 219—69                7 Claims

ABSTRACT OF THE DISCLOSURE

An electric arc drill including structure for adjusting the amplitude of reciprocation thereof and for providing reciprocation at twice the frequency of an applied alternating electric signal. Said structure includes a transformer having a secondary winding, a solenoid electrically connected to one end of the transformer secondary winding at one end, a solenoid core connected to the solenoid at the other end thereof and means for supporting an electrode for reciprocation from the solenoid core whereby a series circuit is completed through the secondary winding of the transformer from ground to the solenoid and through the solenoid core and electrode to a grounded workpiece on contact of the electrode and workpiece. The structure for adjusting the amplitude of reciprocation comprises a movable sleeve connected to the solenoid adjacent the one end thereof. The structure for securing an electrode to the solenoid core includes a hollow electrode supporting member, a sealing member reciprocally mounted within the electrode supporting member having sealing means at one end thereof and chuck structure secured to the electrode supporting member for securing an electrode in an adjusted position within the electrode supporting member. The sealing member in one modification includes bevelled lower surfaces complementary to a bevelled end on an electrode engageable therewith. In another modification the sealing member includes a threaded opening therethrough for threadedly receiving one end of an electrode and in still another modification a sealing disc is positioned beneath the sealing member and a sealing sleeve is secured to the electrode. The sealing member is also disclosed secured directly to the electrode.

---

In the past electric arc drills have been deficient in that the frequency of reciprocation has often been lower than desirable, a single power setting has sometimes been provided and no means has been provided for external adjustment of the amplitude of reciprocation thereof. Prior electric arc drills including these features have been complicated and consequently difficult to manufacture and maintain so that their initial and operating costs have been excessive.

Further, the structure for securing electrodes to prior electric arc drills has not been satisfactory in that the quick exchange of electrodes and positive sealing between the electrodes and drill has not been possible therewith or the structure has been too complicated and expensive for general use.

It is therefore an object of the present invention to provide improved arc discharge, electric drill structure.

Another object is to provide electric arc drill structure having a reciprocating frequency twice that of the electric signal input thereto.

Another object is to provide electric arc drill structure including means for selecting the power output thereof.

Another object is to provide electric arc drill structure including means for adjusting the amplitude of reciprocation thereof.

Another object is to provide electric arc drill structure including improved structure for securing and sealing an electrode to the drill.

Another object is to provide improved electrode securing and sealing structure for use in electric arc drill structure or the like.

Another object is to provide electric arc drill structure which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be disclosed in detail.

Figure 1:
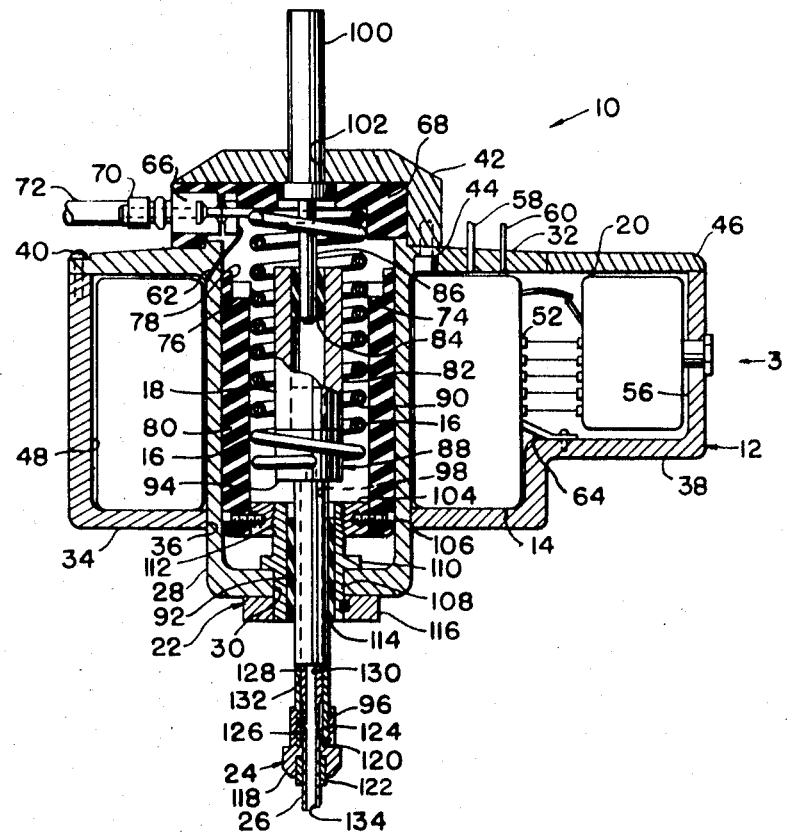
FIGURE 1 is a diagrammatic longitudinal section view of electric arc drill structure constructed in accordance with the invention.

As shown best in FIGURE 1 the arc discharge, electric drill structure 10 includes the housing 12, toroidal transformer 14 positioned within housing 12, the resilient hollow spiral solenoid coil 16 and solenoid core 18. Selector switch 20 and structure 22 for adjusting the amplitude of reciprocation of solenoid core 18 are also provided in the electric arc drill structure 10 along with the electrode securing and sealing structure 24 illustrated best in FIGURE 4.

In operation the electric arc drill structure 10 is connected through conductors 58 and 60 to a source of electric energy (not shown) to energize the toroidal transformer 14. The electric arc drill structure 10 is then moved toward a workpiece until the electrode 26 secured to the drill structure 10 by the securing and sealing structure 24 contacts a workpiece which it is desired to machine by an electric arc discharge. When the electrode contacts the workpiece the solenoid 16 is energized to cause the core 18 to move quickly upward in FIGURE 1, breaking the contact between the workpiece and electrode and creating an arc therebetween to melt the metal immediately adjacent the electrode. The melted metal is immediately cooled and thus broken away from the workpiece by a dielectric coolant flushed through the hollow solenoid coil 16 and the electrode 26.

The frequency of reciprocation of the solenoid core 18 in the electric arc discharge drill structure 10 illustrated in FIGURE 1 is determined by the input frequency of the electric signal to the transformer 14. The power available for creating the arc between the electrode 26 and a workpiece is determined by the setting of the transformer selector switch 20 while the amplitude of reciprocation of the solenoid core 18 and thus the amplitude of reciprocation of the electrode 26 may be adjusted by amplitude adjusting structure 22.

Figure 2:
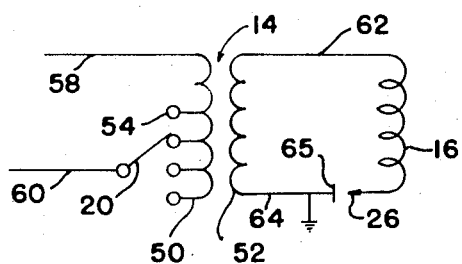
FIGURE 2 is a schematic diagram of the electric circuit of the electric arc drill illustrated in FIGURE 1.

More specifically, the housing 12 includes an inner cylindrical housing 28 including an opening 30 in the bottom thereof and a radially, outwardly extending annular flange 32 at the top thereof shaped as shown best in FIGURE 1, and an outer cylindrical housing 34 having an opening 36 in the bottom thereof through which the inner housing 28 extends and having the generally rectangular projection 38 on one side thereof, as shown in FIGURES 1 and 2, in which the selector switch 20 is positioned. The outer housing 34 may be removably secured to the inner housing 28 by convenient means, such as screws 40. Housing 12 is completed by the cap 42 which may be secured to the inner housing member 28 by convenient means, such as screws 44 and the cover 46 which may be integrally formed with the annular flange 32 of the inner body member 28 or as shown may be removably secured to the rectangular portion 38 of the outer body member 34 by convenient means (not shown).

The toroidal transformer 14 is positioned in the chamber 48 formed between the inner and outer body members 28 and 34 and as shown best in FIGURE 2 includes the primary winding 50 and the secondary winding 52. The primary winding 50 is provided with a plurality of taps 54 thereon and is connected through selector switch 20 positioned in the chamber 56 formed by the rectangular portion 38 of the outer housing 34 and the cover 46 and the electric conductors 58 and 60 to the usual source of sixty cycle one hundred fifteen volt electric energy source.

The power input to the electric arc discharge drill structure 10 may thus be selected as desired by varying the position of switch 20. The secondary winding 52 of the transformer 14 is connected at one end to the solenoid coil 16 by the conductor 62 and is connected to ground at the other end through conductor 64 and the outer body member 34.

The solenoid coil 16 is a hollow, spirally wound, resilient tube of material which will readily conduct electricity such as steel or copper tubing. The solenoid coil 16 is connected at its upper end by convenient tubing coupling structure 66 mounted in an insulator 68 carried by cap 42 to both the conductor 62 and the coupling 70. A dielectric cooling fluid, such as soluble oil and water, is coupled to the solenoid coil 16 through convenient non-conducting flexible hosing 72 from a source of dielectric fluid under pressure (not shown). The solenoid coil 16 is required to be resilient so that it forms a spring providing the return action for the core 18 on breaking of an arc between the electrode 26 held by the core 18 and a conducting workpiece which is grounded.

As best shown in FIGURE 1, the solenoid coil 16 is connected at the lower end thereof to the solenoid core 18. The solenoid coil 16 is further connected by convenient means, such as weld 74, to the annular member 76 positioned in the enlarged diameter portion 78 of the adjusting sleeve 80 for vertical movement with the adjusting sleeve 80.

The solenoid core 18 comprises a cylindrical member 82 having an annular insulating sleeve 84 secured in the upper end thereof by which the core 82 is guided in vertical movement by the guide pin 86 extending through the sleeve 84. An electrode supporting member 88 having the reduced diameter end portions 90 and 92 and the central portion 94 is secured to the bottom of the core 18 for reciprocation therewith by means of inserting the end 90 thereof into the lower end of the core 18 and securing the member 88 to the core 18 by convenient means (not shown).

The reduced diameter end portion 92 is hollow to receive an electrode inserted therein and is provided with exterior threads 96 at the outer end thereof by means of which electrode chucking structure, such as the usual Jacobs chuck 24, may be secured thereto. The lower end of the solenoid coil 16 is connected to a passage 98 in the central portion 94 of the electrode supporting member 88 whereby the dielectric flowing through the hollow solenoid coil 16 is passed through the electrode supporting member 88 and through an electrode held thereby as will be seen subsequently.

The guide pin 86 may be constructed integral with the shank 100 by which the electric arc drill structure 10 is secured to mechanism for movement vertically as required. One such mechanism for moving the electric arc drill structure vertically to provide contact between an electrode held in the electrode supporting member 88 and a workpiece may be a drill press having the usual drill chucking mechanism. The shank 100 extends through the opening 102 in the cap 42 and may be secured thereto by convenient means (not shown). Alternatively the pin 86, shank 100 and cap 42 may be integrally constructed.

The adjusting structure 22 includes an annular internally threaded member 104 secured to the lower end of the adjusting sleeve 80 by convenient means, such as bolts 106, the sleeve 108 extending through the opening 30 in the inner body member 28 having the annular centrally located radially outwardly extending flange 110, and threaded end 112 in engagement with the threaded annular member 104. The sleeve 108 is mounted in the insulating sleeve 114 and the adjusting nut 116 is secured to the lower end of the sleeve 108, as shown in FIGURE 1, against relative rotation with respect thereto.

In operation of the adjusting mechanism 22, as the nut 116 is rotated, the sleeve 108 is rotated to move the adjusting sleeve 80 which is fixed against rotation by solenoid coil 16 vertically on the threaded upper end 112 of sleeve 108. The effective length of the solenoid coil 16 acting as a spring to return the electrode supporting member 88 to its lowermost position is thus changed in accordance with the movement of the adjusting sleeve 80 to control the amplitude of reciprocation of the electrode supporting member 88.

Figure 3:
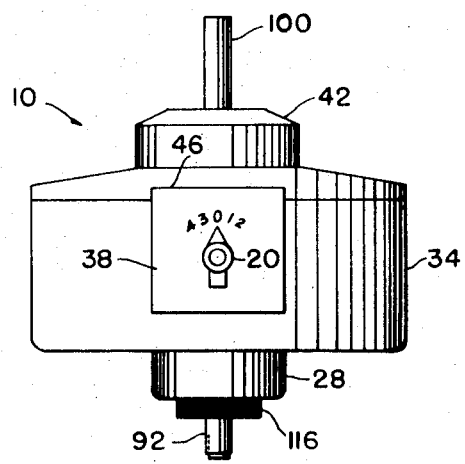
FIGURE 3 is a reduced scale, side elevation of the electric arc drill structure illustrated in FIGURE 1 taken in the direction of arrow 3 in FIGURE 1.

The electric circuit of the arc discharge, electric drill structure 10 is illustrated schematically in FIGURE 3. Thus electric energy from the usual one hundred fifteen volt, sixty cycle alternating current source may be applied over leads 58 and 60 to the primary winding 50 of the toroidal transformer 14. The electric signal transferred from primary winding 50 to the secondary winding 52 of the transformer 14 is selected by means of the selector switch 20 in contact with one of the plurality of taps 54 on the primary winding 50.

The circuit through the solenoid coil 16 in series with the secondary winding 52 of the transformer 14 is completed to ground through an electrode 26 held by the electrode supporting member 88 on the electrode 26 contacting a grounded workpiece 65. On contact between the electrode 26 and workpiece 65 a signal is provided through the solenoid coil 16 to move the solenoid core 18 and the electrode 26 secured thereto through the electrode supporting member 88 away from the workpiece breaking the circuit through the coil 16 to deenergize the coil and permit the coil to act as a spring. The coil then acting as a spring will return the core to the position wherein the electrode 26 again contacts the grounded workpiece 65 whereby reciprocal movement of the electrode 26 is produced and a plurality of arcs are successively drawn between the electrode and grounded workpiece.

Figure 4:
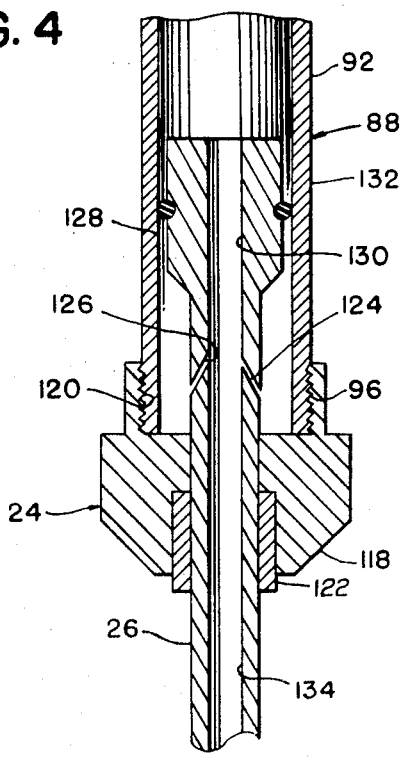
FIGURE 4 is an enlarged longitudinal section view of the electrode securing and sealing structure of the electric arc drill structure illustrated in FIGURE 1.

The electrode securing and sealing structure 24 best shown in FIGURE 4 includes the chuck structure 118 secured to the externally threaded end 96 of the electrode supporting member 88 by means of the internally threaded sleeve 120 on the chuck structure. The chuck structure 118 which may be the well known Jacob type chuck structure is operable to secure the electrode 26 in a vertically adjusted position to the electrode supporting member 88 by means of the clamping fingers 122. The upper end of the electrode 26 is provided with the annular bevelled surface 124 which makes sealing engagement with the reversely bevelled surface 126 of the sealing member 128 of the securing and adjusting structure 24.

The sealing member 128, as shown, is provided with a longitudinal opening 130 therethrough through which the dielectric fluid in the hollow end 96 of the electrode supporting member 88 is passed into the longitudinal opening 132 of the hollow electrode 26. A seal is provided between the inner surface of the end 96 of the electrode supporting member 88 and the sealing member 128 by the O-ring sealing member 132. In operation the pressure of the dielectric pumped through the solenoid coil 16 into the electrode supporting member 88 will cause the conical surfaces 124 and 126 to seal. The sealing member 128 will, however, allow the electrode 26 to be inserted at different lengths through the chuck structure 118.

Figure 5:
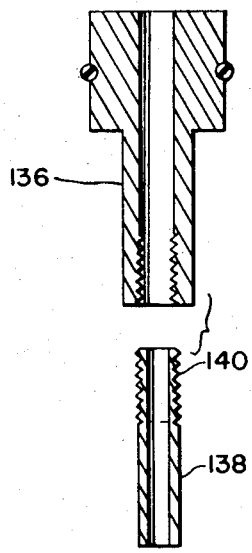
FIGURES 5, 6 and 7 are modifications of the electrode securing and sealing structure illustrated in FIGURE 4.

Alternatively the sealing member may take the form illustrated in FIGURE 5. In FIGURE 5 a threaded connection is provided between the sealing member 136 and an electrode 138 having a threaded end 140.

Figure 7:
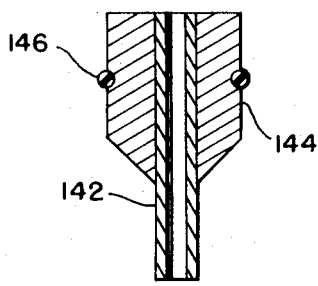

Alternatively electrodes 142, such as illustrated in FIGURE 7, having a mounting sleeve 144 thereon including the annular sealing ring 146 may be provided for use in conjunction with chuck structure having a wide opening and the electrode supporting member 88. Thus the separate sealing member may be done away with.

Figure 6:
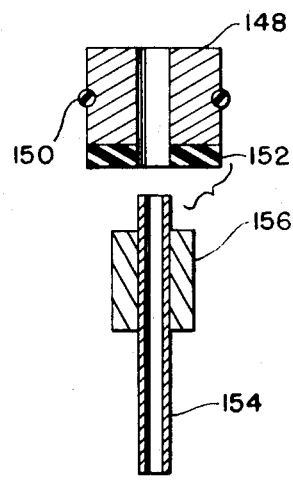

A separate sealing member 148 having the O-ring seal 150 thereon and sealing washer 152 integrally constructed therewith may be used in conjunction with electrodes 154 having no sealing means secured thereto but provided with the guiding head 156 as shown in FIGURE 6 if desired. With this construction the seal 152 or O-ring may be secured to the guiding head if desired.

In over-all operation, with an electrode 26 secured in the chuck structure 118 and with the sealing member 128 urged toward the electrode 26 to provide a seal therebetween over the conical surfaces 124 and 126 due to the pressure of dielectric pumped through the solenoid coil 16 and the electrode supporting member 88, the arc discharge electric drill structure 10 is moved toward a grounded workpiece until the electrode 26 engages the workpiece 65.

With electric energy supplied through conductors 58 and 60 and through a selected tap 54 on the primary winding 50 of transformer 14 chosen to provide predetermined power for machining the workpiece through setting of switch 20, current will flow through the solenoid coil 16 to cause the core 18 to move upwardly, as shown in FIGURE 1, from its lowermost position as the electrode 26 contacts the conductive workpiece 65. An electric arc is drawn between the separating workpiece and electrode which melts the metal beneath the tip of the electrode. The melted metal is rapidly cooled by the dielectric flowing through the electrode 96 so that it breaks away from the body of the workpiece and is washed away with the dielectric.

The solenoid coil 16 now acts as a spring since the electric circuit therethrough is broken to return the core 18 to its lowermost position wherein the electrode again contacts the workpiece to again start the cycle of operation of the arc discharge electric drill structure 10, as set forth above.

The entire electric arc discharge drill structure 10 must be lowered periodically to insure contact of the electrode with the workpiece on reciprocation thereof as the metal of the workpiece is eroded.

While one embodiment of the present invention and modifications thereof have been considered in detail, it will be understood that other embodiments and modifications are contemplated. It is the intention to include all embodiments and modifications of the invention as are defined by the appended claims within the scope of the invention.

What I claim as my invention is:

1. Electric discharge machining structure comprising means for supporting an electrode and moving the electrode toward a workpiece, including a solenoid core connected to the electrode, and a solenoid coil, one end of which is connected to the solenoid core, means operably associated with the means for supporting and moving the electrode toward the workpiece for applying an alternating electric signal between the workpiece and electrode, means for producing reciprocal movement of the electrode in response to the alternating electric signal on contact of the electrode with the workpiece and means operably associated with the means for producing reciprocal movement of the electrode for adjusting the amplitude of the reciprocation of the electrode, including a sleeve surrounding the solenoid coil connected to the solenoid coil adjacent the other end thereof and means for adjusting the sleeve axially.

2. Arc discharge electric drill structure including a transformer having primary and secondary windings, a spirally wound solenoid coil, means for placing the solenoid coil in series with the secondary winding of the transformer through an electrode and workpiece, a solenoid core positioned within the solenoid for movement axially thereof on energization of the solenoid coil, means supported by the solenoid core for supporting the electrode for reciprocal movement on energization of the solenoid coil and means for adjusting the amplitude of reciprocation of the solenoid core on energization of the solenoid coil comprising a sleeve rigidly connected to the solenoid coil adjacent the other end thereof and means for adjusting the sleeve axially.

3. Structure as set forth in claim 2 wherein the means for supporting an electrode includes a hollow tubular member, a chuck structure secured to one end of the hollow tubular member, and a hollow sealing member including sealing means around the outer periphery thereof reciprocally mounted in the tubular member.

4. Structure as set forth in claim 3 wherein the sealing member includes a bevelled sealing surface on the end thereof adjacent the chuck structure.

5. Structure as set forth in claim 3 wherein the sealing member includes internal threads in the one end thereof adjacent the chuck structure for receiving the threaded end of a hollow electrode.

6. Structure as set forth in claim 3 wherein the sealing member includes an annular sealing member on the end surface thereof adjacent the chuck structure.

7. Structure as set forth in claim 6 wherein the sealing member includes an annular sealing member on the outer periphery thereof.

References Cited

UNITED STATES PATENTS 2,383,383  8/1945  Harding _____ 219—69
2,814,712  11/1957  Fulmer _____ 219—253 X JOSEPH V. TRUHE, Primary Examiner R. F. STAUBLY, Assistant Examiner